UNITED STATES PATENT OFFICE.

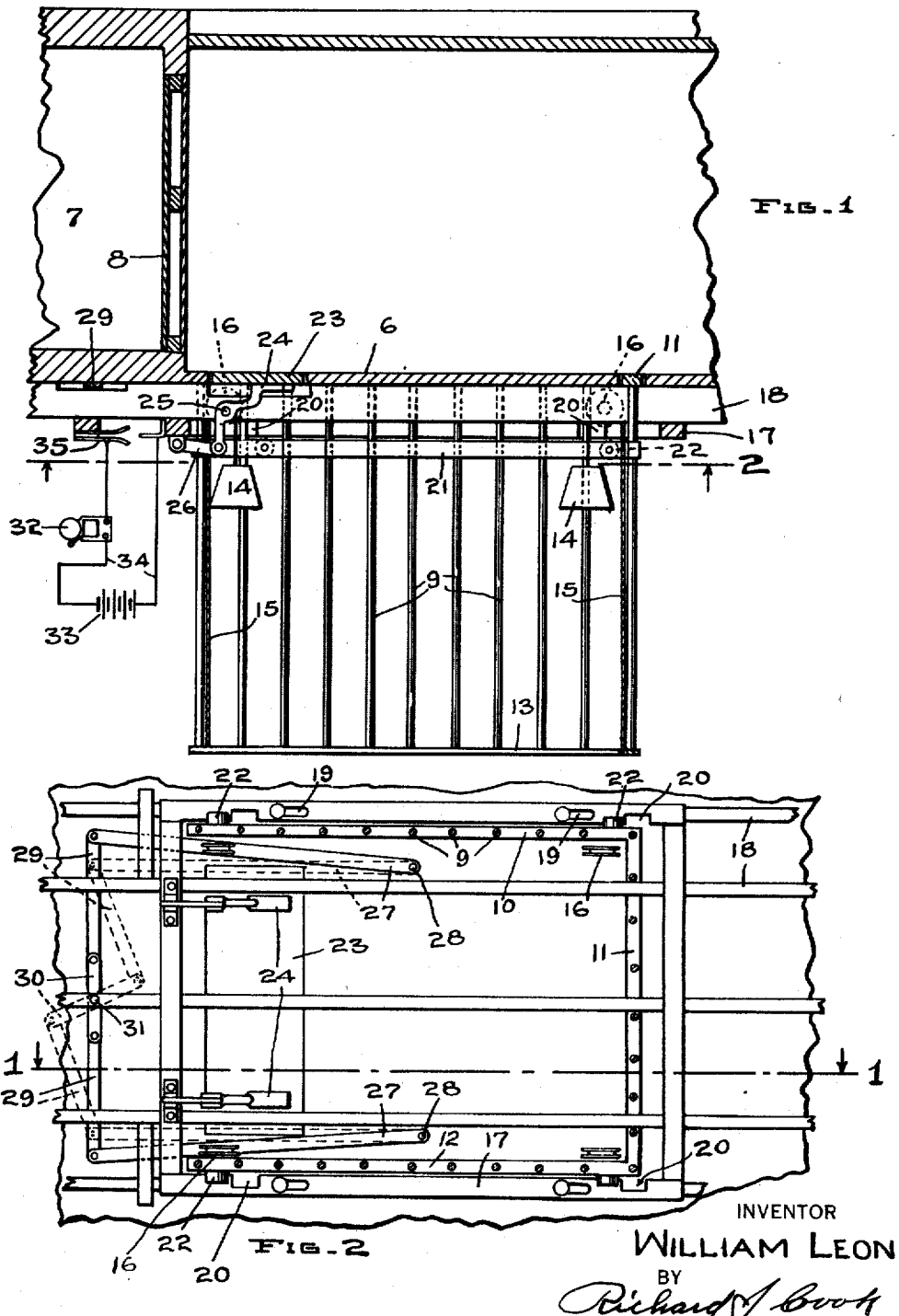

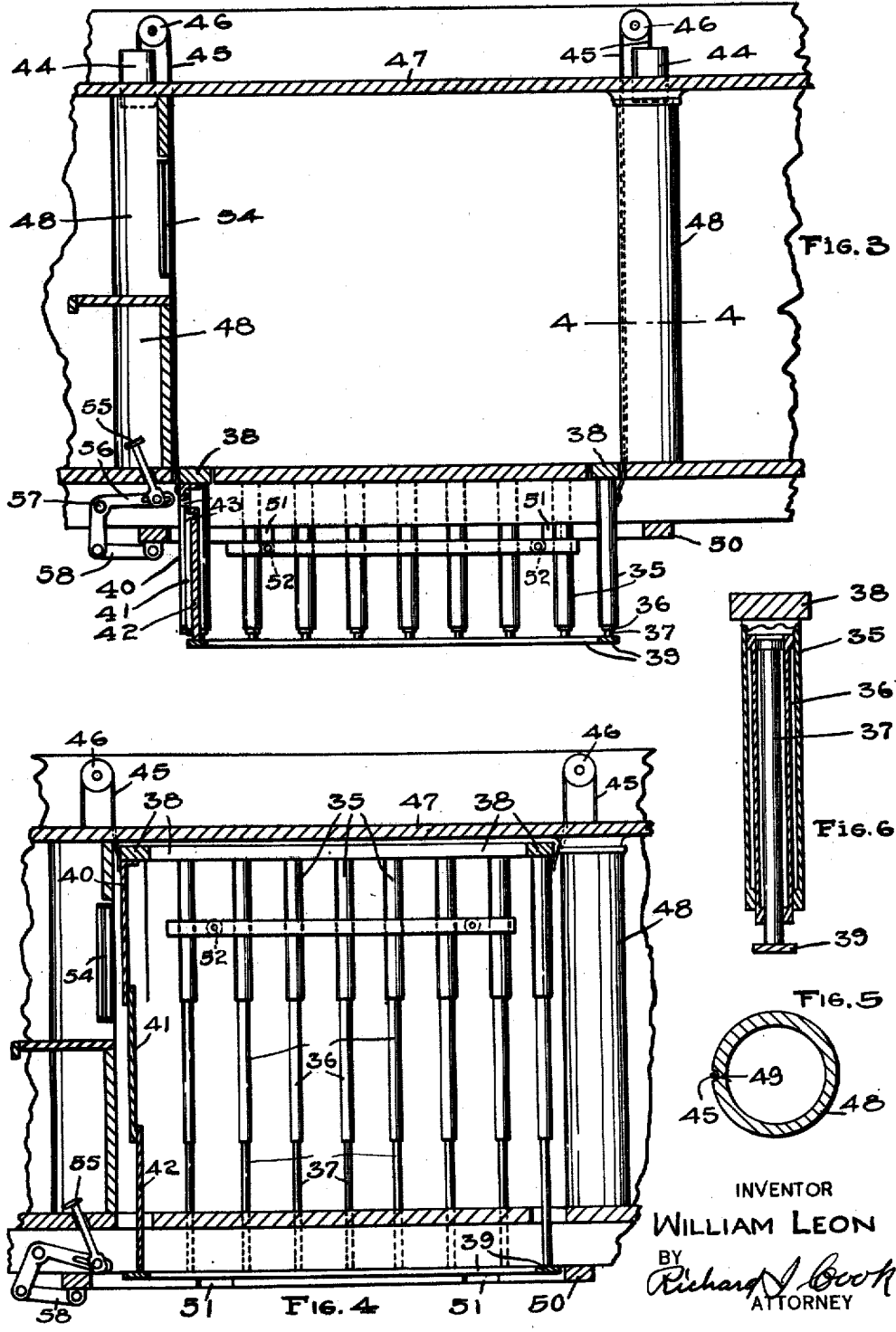

WILLIAM LEON, OF SEATTLE, WASHINGTON.

BURGLAR-TRAP.

1,300,981. Specification of Letters Patent. Patented Apr. 15, 1919.

Application filed March 21, 1918. Serial No. 223,866.

*To all whom it may concern:*

Be it known that I, WILLIAM LEON, a citizen of the United States, residing at Seattle, in the county of King and State of Washington, have invented a new and useful Improvement in Burglar-Traps, of which the following is a specification.

This invention relates to improvements in burglar traps and is an improvement over the trap shown and described in my prior Patent No. 1,200,629, issued October 10, 1916.

The object of this improvement is to provide a trap in the form of a cage, that may be arranged and set so that it will rise above the floor and entrap a burglar when the latter steps on an invisible panel in the floor within the outlines of the cage.

A further object is to provide a trap of this class, that is adapted to telescope when not in operation so that it may be put into a relatively small space.

The invention consists in the novel construction of a burglar trap and in the adaptation and combination of such trap with actuating means for the same, as will be more clearly illustrated in the accompanying drawings described in the following specification and finally pointed out in the appended claims.

In the drawings, Figure 1 is a vertical section substantially on a broken line 1—1 of Fig. 2 of a burglar trap constructed in accordance with this invention; Fig. 2 is a view in sectional elevation on a broken line 2—2 of Fig. 1; Fig. 3 is a view in vertical section of a modified form of the device shown in Figs. 1 and 2; Fig. 4 is a view similar to Fig. 3 except that the cage is shown in a lifted or operative position; Fig. 5 is an enlarged view in cross section on broken line 4—4 of Fig. 3; and Fig. 6 is an enlarged view partly in section and partly in elevation of one of the telescoping bars used in the device of Fig. 3.

Referring to the drawings throughout which like reference numerals indicate like parts, the numeral 6 indicates the floor of a building and 7 indicates a vault or safe in which valuables are stored, the vault being provided with a door 8 which must be approached by any person seeking to gain access thereto.

The trap comprises a rectangular cage having three closed sides formed of bars 9 and one open side that is so disposed that the front of the vault forms a closure therefor when the cage is lifted into an operative position.

The tops of the bars are secured to a frame having three sides 10, 11 and 12, respectively, as more clearly shown in Fig. 2, and the bottoms of the bars are secured to a similar frame 13, as shown in Fig. 1.

The bars 10, 11 and 12 are of the same finish on the top surface as the floor 6 and normally rest flush therewith so that they will not be noticeable by persons on the floor.

The trap is disposed below the floor, as for instance in a basement, when it is not in use and is adapted when it is released to rise up quickly in front of the vault and entrap any person that may be attempting to open the door of the vault.

The trap is adapted to be lifted by weights 14 disposed adjacent each of the four corners thereof and connected with cables 15 that pass over pulleys 16 and thence downwardly to the lower corners of the trap to which they are secured.

By this arrangement it is obvious that the weights will hang suspended and ready for operation at all times.

The trap is held in a lowered or set position by a rectangular frame 17 that is secured to the joists 18 that support the floor by means of slot and pin connections indicated at 19 that admit of a limited lengthwise movement of the frame 17.

The frame is provided near its four corners with slots or notches 20 and the cage is provided on two sides with fixedly secured bars 21 that are arranged to just clear the inside of the frame as the cage is moved up and down, the bars having rollers 22 secured thereto and projecting outwardly therefrom to engage below the frame 17 and hold the cage in a lowered or set position, as shown in Fig. 1.

When the frame 17 is moved to the left far enough to permit the rollers 22 to register with the notches 20, the rollers will pass upwardly through such notches and the cage will rise above the floor 6.

The movement of the cage is governed by an automatic trip device which comprises a loose panel or pedal 23 in the floor 6 just in front of the door of the vault and upon which it will be necessary for a burglar to stand if he attempts to open the vault door.

The panel 23 is supported upon two bell crank arms 24 that are pivoted as at 25 and are connected by links 26 with the end bar of the frame 17 so that any weight that depresses the panel 23 will move the frame 17 to the left and cause the slots 20 to register with and permit the passage of the rollers 22.

Any convenient device may be provided for locking or supporting the pannel 23 in a fixed position, as for instance, bars 27 may be pivoted at one end, as at 28, and may be articulated at their other end with links 29, that are pivotally connected with the opposite ends of a bar 30, that is, mounted on a central pivot 31, so that it may be turned from the position shown in full lines in Fig. 2 to the position shown in broken lines, thereby moving the bars 27 under the ends of the panel 23, so that they will support the same and prevent the tripping device from releasing the cage.

The bar 30 may be connected with any suitable means above the floor 6 if desired so that it may be quickly and easily turned to set or to lock the trip mechanism.

For the purpose of sounding an alarm when the cage is lifted, I have provided an electric bell 32 that may be connected with a battery 33 by a circuit 34, the circuit 34 being provided with a switch 35 that is adapted to be closed when the frame 17 is moved to the left far enough to release the cage.

In Figs. 3 and 4 I have illustrated a cage similar to the one shown in Figs. 1 and 2, except that it is provided with bars each made up of a plurality of sections 35, 36 and 37 that are adapted to telescope within each other, as more clearly shown in the enlarged view in Fig. 6.

The upper sections 35 are each secured to frame bars 38 that rest flush with the floor when the cage is lowered and the lower sections 37 are each secured to frame members 39 that may rest upon the bottom of the recess in which the cage is disposed when the same is folded.

If desired, the front wall of the device may be made of solid metal plates 40, 41 and 42 that are slidably connected with each other by slot and pin connections, as indicated by 43, and form a bullet proof front wall when the cage is in a raised position.

The cage is adapted to be lifted by weights 44 secured on cables 45, that pass over pulleys 46 located above the ceiling 47 of the room in which the trap is used.

Hollow posts 48 or supporting columns are preferably utilized for concealing the cables 45, such columns having recesses 49, see Fig. 5, in which the cables are disposed so that they will not be noticed unless a close examination is made.

The weights 44 may be so positioned that they will be adapted to move up and down in the columns 48 and the pulleys 46 may be disposed above the ceiling 47.

The cage shown in Fig. 3 is held in its lowered position by a frame 50 similar to the frame 17 that is provided with notches 51 to permit the passage of rollers 52 when the frame 50 is moved to the left.

This device is herein shown as installed in front of a cashier's window 54 in such a position that a hold-up man approaching the window would be obliged to stand within the area inclosed by the cage.

The cage is adapted to be tripped by pressure on a pedal 55 below the cashier's window that is articulated with one end of a bell crank 56 that is medially pivoted as at 57 and has its other end connected by a link 58 with the end of the frame 50 so that when the pedal is depressed the frame will be moved to the left and will release the cage.

If it is desired to install the trap having telescoping bars in front of a vault door, the same may be installed as shown in Fig. 3 and provided with an automatic tripping device of the type shown in connection with Figs. 1 and 2.

The telescoping features of the device shown in Fig. 3 enable the same to be used where there is not sufficient room below the floor to accommodate the length of the device shown in Figs. 1 and 2.

It is obvious that changes in the form of construction and arrangement of the various parts of this device may be made within the scope of the following claims.

What I claim, and desire to protect by Letters Patent, is:

1. A device of the class described comprising a cage disposed below a floor and adapted to move upwardly through openings in the floor, means for quickly lifting said cage through said floor, trip mechanism for normally retaining said cage below said floor and a concealed panel in said floor and connected to said trip mechanism to actuate said trip mechanism in response to pressure thereon.

2. A device of the class described comprising a cage having an open top end and disposed below a floor, said cage being adapted to move upwardly through openings in said floor, weights for lifting said cage quickly, trip mechanism for normally retaining said cage below said floor, a concealed panel provided in said floor and resting on said trip mechanism to actuate the same in response to the presence of a weight on said panel and means for rendering said panel inoperative with respect to said trip mechanism.

3. A device of the class described comprising a cage having an open top end and disposed below a floor, said floor having openings through which the sides of said cage are movable vertically, means for quickly moving said cage upwardly through the openings in said floor, trip mechanism for normally retaining said cage below said floor and means within the boundaries of said cage for automatically releasing said trip mechanism in response to the presence of a weight.

4. A device of the class described comprising a cage having an open top end, said cage being disposed below a floor and being movable upwardly through openings in the floor, a frame below the floor and surrounding said cage, said frame being movable with respect to said cage and having notches on its inner side, means for quickly lifting said cage above said floor, projections on said cage to normally engage the lower side of said frame and retain said cage below said floor and means for moving said frame to permit said projections to pass through said notches, whereby said cage may be raised.

5. A device of the class described comprising a cage having an open top end, said cage being disposed below a floor and adapted to move upwardly through openings in said floor, a frame below said floor and surrounding said cage, said frame being movable with respect to said cage and having notches directed toward said cage, means for quickly lifting said cage above said floor, projections on said cage and normally engaging the lower side of said frame to retain said cage below said floor, a concealed panel in said floor and means connecting said frame and said panel for moving said frame to permit said projections to pass upwardly through said notches in response to the presence of a weight on said panel.

6. A device of the class described comprising a rectangular cage having an open top and one open side, said cage being disposed below a floor and being movable upward through said floor adjacent a wall that forms a closure for the open side of said cage when the latter is raised, means for quickly lifting said cage, a rectangular frame surrounding said cage below said floor and movably connected with said floor, said frame having notches adjacent the four corners of said cage, projections on said cage adapted to engage below said frame when said frame is in one position and to pass through said notches when said frame is in another position, a panel in the floor within the boundaries of said cage, pivoted bell cranks supporting said panel and connected with said frame for moving said frame in response to the presence of a weight on said panel and means for rendering said panel inoperative with respect to said bell crank.

7. A device of the class described comprising a cage constructed of telescoping members and adapted to be disposed below a floor within a relatively small space, said floor having openings through which said frame may be lifted above said floor, means for quickly lifting said cage, trip mechanism for normally retaining said cage below said floor and means above said floor for releasing said trip mechanism.

Signed by me at Seattle, Washington, this 19th day of November, 1917.

WILLIAM LEON.

Witnesses:
E. B. HERALD,
D. C. KUHNS.

Copies of this patent may be obtained for five cents each, by addressing the "Commissioner of Patents, Washington, D. C."